United States Patent [19]

Smith et al.

[11] Patent Number: 4,761,083

[45] Date of Patent: * Aug. 2, 1988

[54] COMPOUND BEARING

[75] Inventors: Joseph E. Smith, Birmingham; William H. Trudeau, Brighton, both of Mich.

[73] Assignee: O & S Manufacturing Company, Whitmore Lake, Mich.

[ * ] Notice: The portion of the term of this patent subsequent to May 25, 1999 has been disclaimed.

[21] Appl. No.: 207,215

[22] Filed: Nov. 17, 1980

[51] Int. Cl.⁴ .............................................. F16C 11/08
[52] U.S. Cl. .................................... 384/208; 384/220; 384/146
[58] Field of Search ...................... 308/72, 73, DIG. 7, 308/DIG. 8, 239, 238, 36.1, 36.2; 384/208, 220, 146, 207, 209, 213

[56] References Cited

U.S. PATENT DOCUMENTS

| | | | |
|---|---|---|---|
| 2,683,637 | 7/1954 | Skillman et al. | 308/72 |
| 3,822,068 | 7/1974 | Litherland | 277/208 |
| 4,076,344 | 2/1978 | Gaines et al. | 308/72 |
| 4,263,814 | 4/1981 | Takaoka et al. | 308/DIG. 8 |
| 4,331,367 | 5/1982 | Trudeau et al. | 308/26 |

FOREIGN PATENT DOCUMENTS 667966  8/1963  Canada ......................... 308/DIG. 7

Primary Examiner—Lenard A. Footland
Attorney, Agent, or Firm—Gifford, Groh, VanOphem, Sheridan, Sprinkle and Dolgorukov

[57] ABSTRACT

A compound bearing consisting of an outer and an inner member movable relative to each other and between which are disposed load carrying annular members. The load carrying annular members comprise a pair of elastomeric rings held between the outer and inner members under compression, and a metallic ring insert disposed between and separating the two elastomeric rings. A narrow clearance is provided between the peripheral surface of the metallic ring insert and the inner surface of the bearing outer member, and between the metallic ring inner surface and the inner member peripheral surface. Normal loads are taken and absorbed by the elastomeric rings, while overloads and shock loads are taken by the metallic ring insert.

15 Claims, 1 Drawing Sheet

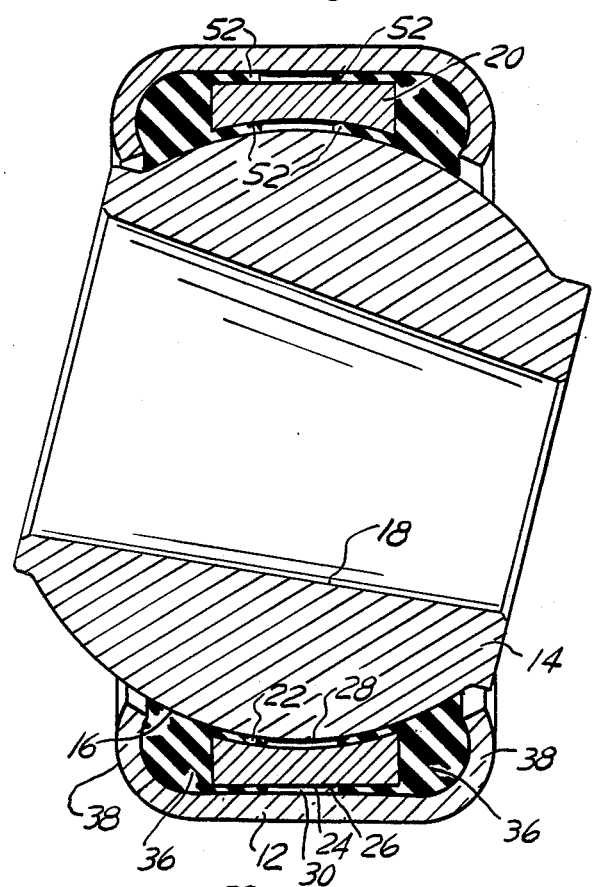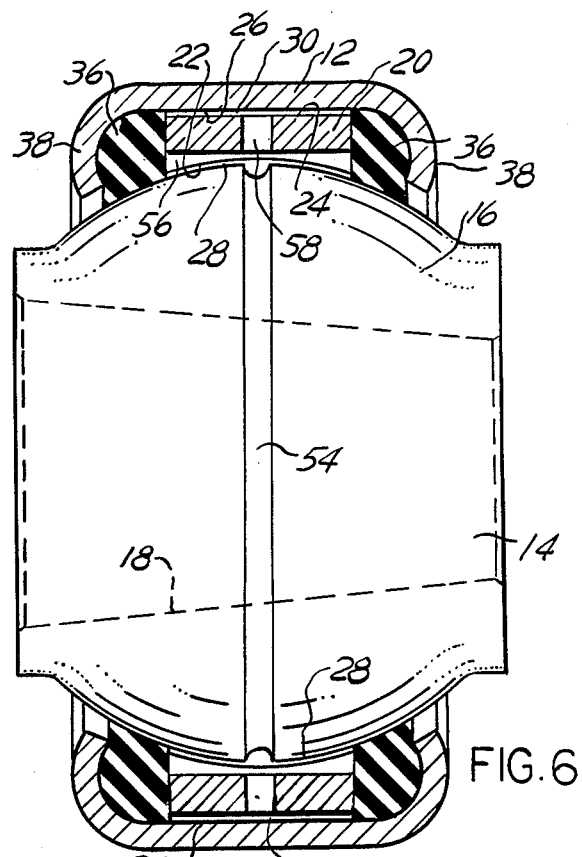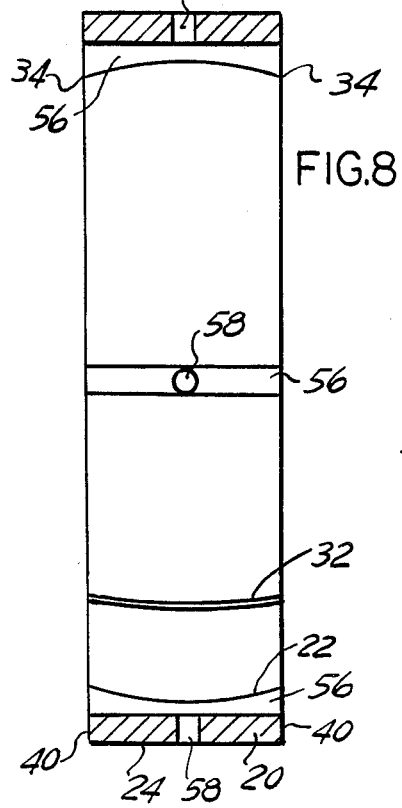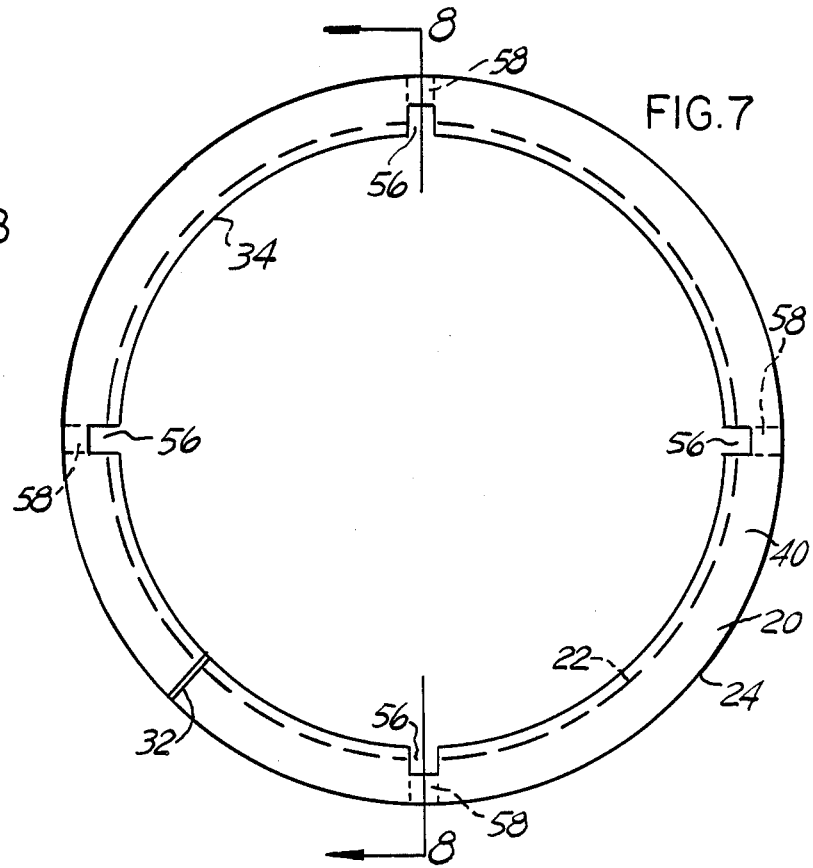

COMPOUND BEARING

BACKGROUND OF THE INVENTION

The present invention relates to a bearing structure, and more particularly to a bearing structure adapted for oscillatory motion under heavy load.

The present invention is an improvement on the compound bearing disclosed in U.S. Pat. No. 2,683,637. That patent teaches a bearing structure between an inner member and an outer member consisting of a nylon or similar plastic insert ring interposed between the inner and outer members, and a pair of lubricant impregnated fabric annular members also disposed between the inner and outer members, one on each side of the nylon or other plastic insert ring. The structure is such that normal loads on the bearing are carried by the lubricant impregnated material, and heavy loads or shock loads on the bearing are taken principally by the plastic insert ring.

It has been found that bearings according to the aforesaid patent, although satisfactory and long-lived under average medium duty service, tend to deteriorate rapidly when subjected to extremely heavy loads, especially if subjected to heat simultaneously with heavy loads, and more particularly in assemblies where adverse conditions of heavy load and heat are accompanied by substantial vibrations and shocks and an exaggerated amount of twisting, or relative motion, between the inner member and the outer member of the bearing. Such extremely adverse conditions are particularly prevalent when spherical bearings are utilized as a junction between suspension members and frame members, such as shock absorber attachment means in heavy duty motor vehicles, for example military combat vehicles, which are generally poorly maintained and called upon to operate under extremely adverse conditions. It has been discovered that under such extreme adverse conditions, when the bearings are continuously subjected to rapid twisting cycles under extremely heavy loads with repeated high frequency shocks, prior art bearings tend to heat up and, when further subjected to heat from the ambient, they deteriorate rapidly. The lubricant impregnating the fabric annular members becomes very fluid and extrudes from the fabric, and the extreme heat chars the fabric annular members and destroys the nylon or other plastic insert ring. It has also been discovered that because the prior art bearings are pre-loaded during manufacturing, they are relatively tight when new, and thus they provide a relatively stiff connection between the joined components and tend to generate heat when the engaged surfaces of the various components of the bearings are displaced relative to each other, due to the relatively high co-efficient of friction between the bearing element surfaces.

SUMMARY OF THE INVENTION

The present invention remedies the disadvantages and inconveniences of the prior art, more particularly in heavy duty bearing assemblies subjected to oscillatory motion under heavy loads, especially loads of a shock nature occurring at frequent intervals, by providing a bearing structure wherein a metallic ring insert is used in replacement of the nylon or plastic ring insert of the prior art bearings, and wherein a pair of pre-stressed pre-loaded rings made preferably of unctuous and elastomeric plastic material such as one of the fluoroplastics, or fluorocarbons, for example polyvinylidene fluoride, chlorotrifluoroethylene, and more particularly fluorinated ethylenepropylene and polytetrafluoroethylene, is disposed between the inner and the outer members of the bearing assembly one on each side of the metallic ring insert. The metallic ring insert has clearance between its inner surface and the outer surface of the inner member of the bearing and between its outer surface and the inner surface of the outer member or shell of the bearing. Normal loads are absorbed by the elastomeric rings, and the heavy loads and shocks are first absorbed and dampened by the fluorocarbon rings, and subsequently, after being greatly diminished, are taken by the metallic ring insert. The principal advantage and object of the present invention are to provide a heavy duty bearing structure capable of being subjected to heavy loads and repeated vibrations and shocks under adverse heat and dust conditions and which in operation, generates much less heat than prior art pre-loaded bearings having bearing elements made of lubricant-impregnated fabrics and nylon, or similar plastic, ring inserts, which has less stick-up, i.e. provides relative motion between the inner and outer members of the bearing under relatively low torque, and is endowed with long life under extremely harsh conditions of operation and adverse environment.

The many objects and advantages of the present invention will become apparent to those skilled in the art when the following description of the best modes contemplated for practicing the invention is read in conjunction with the accompanying drawing wherein:

BRIEF DESCRIPTION OF THE DRAWING

FIG. 5 is a view similar to FIG. 1, showing the compound bearing of the invention in an extreme twist position, and illustrating the structure thereof after wearing of the bearing;

FIG. 6 is a view similar to FIG. 1 but showing a modification thereof;

FIG. 7 is a side elevation view of an example of ring insert forming part of the bearing assembly of FIG. 6; and FIG. 8 is a section from a line 8—8 of FIG. 7.

DETAILED DESCRIPTION OF THE PREFERRED EMBODIMENTS

Figure 1:
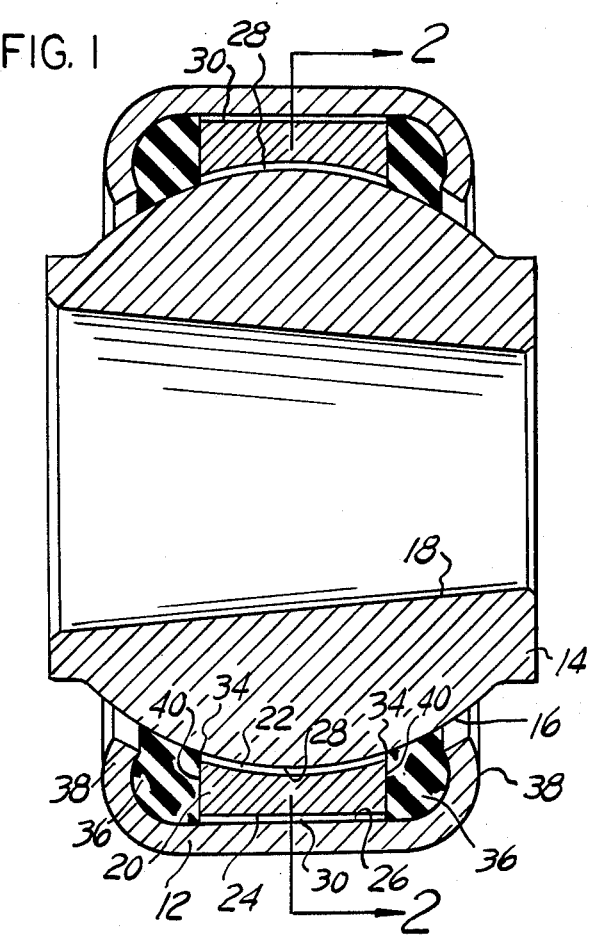
FIG. 1 is a longitudinal section through a compound bearing, of the spherical or ball type, according to the present invention.
Figure 2:
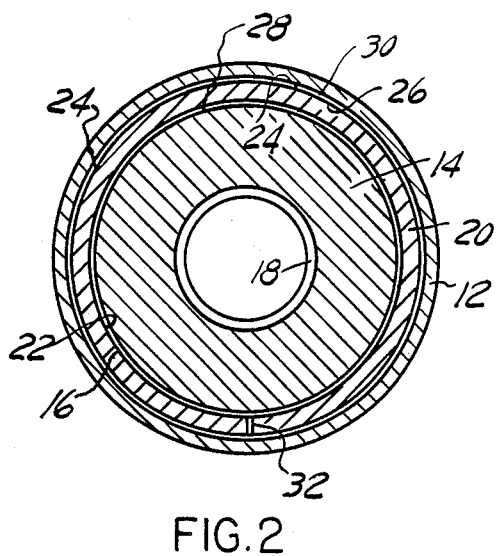
FIG. 2 is a transverse section thereof along lines 2—2 of FIG. 1.

Referring to the drawing, and more particularly to FIGS. 1-2, an example of a compound bearing structure according to the present invention is illustrated as comprising an outer bearing member or shell 12, within which is disposed an inner bearing member or ball 14 having a peripheral spherical surface 16. The inner bearing member 14 is provided with an axially disposed bore 18 which, in the example of structure illustrated, is tapered such as to accept therethrough a tapered male member, not shown, such as, for example, a shock absorber support stud fastened to the frame of a motor vehicle or the like. Typically, in such shock absorber mounting assemblies, the shell 12 is clampingly, or otherwise fastened, on the end of the rod, or of the housing, of a telescopic shock absorber, not shown.

The outer member or shell 12 is conveniently made of steel or like material, and the inner member or ball 14 is also made conveniently of a steel or stainless steel forging or bar machined such as to be provided with the spherical surface 16 having a relatively smooth finish. An annular member made preferably of steel and forming a ring insert 20 is peripherally disposed around the bearing inner member 14, the ring insert 20 having an inner concave spherical surface 22 conforming to the inner member outer spherical surface 16, and an outer cylindrical surface 24 conforming to the inner bore surface 26 of the shell 12. However, the dimensions of the ring insert 20 are such that there is a narrow gap or clearance 28 between the outer spherical surface 16 of the inner member 14 and the inner spherical surface 22 of the ring insert 20, a similar clearance 30 being present between the bore surface 26 of the shell 12 and the outer surface 24 of the ring insert 20. Such clearances 28 and 30 are shown greatly exaggerated throughout the several views of the drawing. For ease of installation around the inner member, the ring insert 20 has a radial cut or slit 32, FIG. 2, enabling the ring insert 20 to springingly increase in circumference, during assembly, so as to allow one of the inner edges 34 of the ring insert 20 to be passed over the diameter of the spherical surface 16 of the inner member 14, allowing the ring insert 20 to snap back to its original shape and dimension once situated around the inner member 14 in the position illustrated at FIG. 1.

On each side of the metallic ring insert 20 there is disposed a full bearing ring 36 made of slightly resilient elastomeric material such as any convenient synthetic plastic resin, preferably a fluoroplastic, or fluorocarbon, which provides a certain amount of lubricity to its surface in contact principally with the spherical surface 16 of the bearing inner member 14. A group of fluoroplastics, or fluorocarbons which has been found particularly advantageous for making the elastomeric rings 36 consists of polyvinylidene fluoride, chlorotrifluoroethylene, and more particularly fluorinated ethylene-propylene and preferably polytetrafluoroethylene. The fluorocarbon rings 36 are substantially compressed when the diverse elements forming the compound bearing of the invention are assembled, and they form the principal load absorbing and shock absorbing capability of the bearing of the invention. The pre-load exerted on the fluorocarbon rings 36 is directed radially, and also laterally in view of the presence of the integral retaining flanges 38 of the shell 12 holding the diverse elements in assembly. The bearing of the invention is normally assembled by placing in the shell 12, made preferably of a cup-shaped stamping provided with a pre-formed integral retaining flange 38, the inner member 14 around which are disposed the ring insert 20 and the fluorocarbon rings 36, one on each side of the ring insert 20. The assembly is completed by forming the other retaining flange 38 by a swaging or like operation, thus placing the two fluorocarbon rings 36 under compression, with any amount of desired pre-load. In addition, considerable pressure is exerted by the compressed elastomeric rings 36 against the lateral faces 40 of the ring insert 20.

Figure 4:
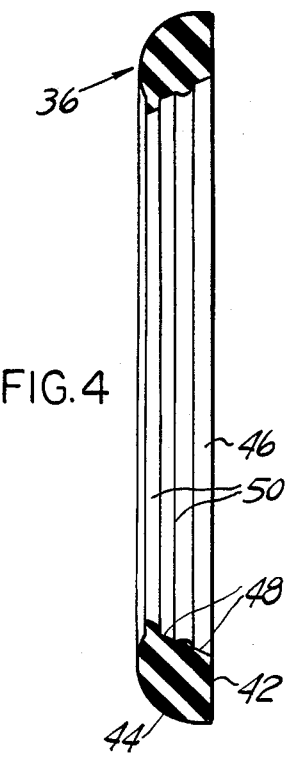
FIG. 4 is a section from line 4—4 of FIG. 3.
Figure 3:
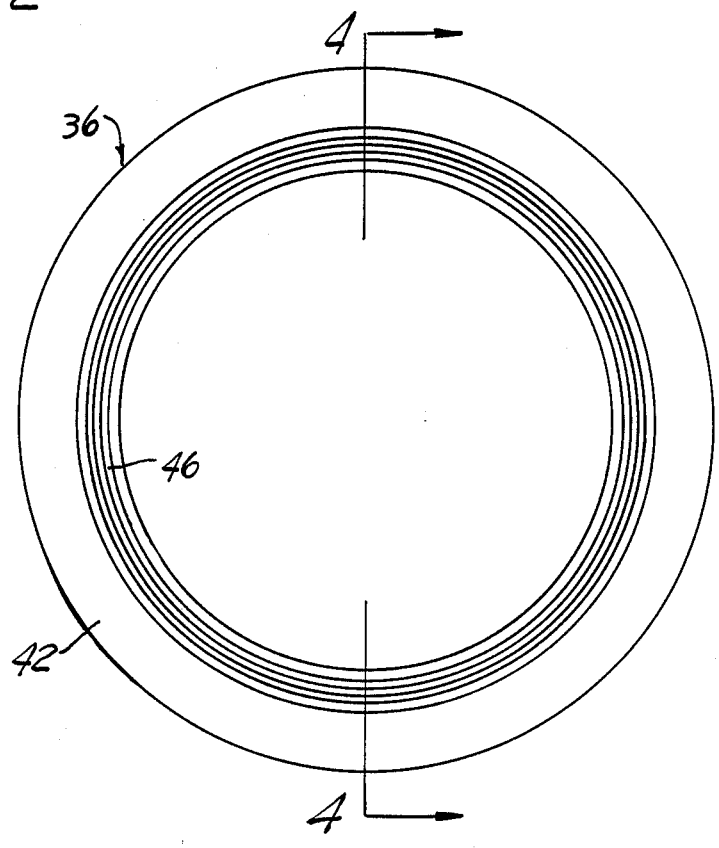
FIG. 3 is a side elevation view of a tetrafluroethylene ring, or other fluorocarbon ring, forming part of the bearing assembly of FIGS. 1-2.

The resilient rings 36, which are preferably made of a fluoroplastic, or fluorocarbon, material as previously mentioned, may have any convenient annular shape in their free state prior to assembly with the other elements, and swaging of the shell retaining flange. For example, the rings 36 may be shaped as conventional O-rings, or they may be in the form of toroids having a rectangular, square or eliptical cross-section. Preferably the rings 36 are shaped as illustrated at FIGS. 3-4, that is, they are molded or machined with a flat annular side surface 42 for engagement with the side annular flat surface 40 of the ring insert 20 (FIG. 1), with a radiused lateral surface 44 substantially conforming to the shape of the inner radiused corner of the shell 12 at the junction between the straight bore portion of the shell and the integral retaining flange 38, and with an inner surface 46 provided with a series of serrations consisting of consecutive annular groove-like depressions and projecting annular ribs as shown at 48 and 50 respectively. Following assembly and pre-loading of the rings 36, the inner serrated surface 46 of the rings becomes continuous and conforms generally to the spherical contour of the spherical surface 16 of the inner member 14. It has been observed that the inner serrated surface 46 of the rings 36 permits to increase compression pre-load of the rings without causing appreciably increased stick-up, as compared to a smooth surface, improves the longevity of the bearing, and apparently enables the rings 36 to act as more efficient seals against the introduction of ambient dust or other dirt between the bearing surfaces.

The clearance 28, FIGS. 1 and 2, between the concave spherical inner surface 22 of the ring insert 20 and the peripheral spherical surface 16 of the bearing inner member 14, and the clearance 30 between the inner surface 26 of the shell 12 and the peripheral cylindrical surface 24 of the ring insert 20, are very small, of the order of a fraction of a millimeter or a few thousandths of an inch. It has been found that, for best over-all performance, it is desirable to hold each of such clearances or gaps to more than about 0.02 mm. and to less than about 0.25 mm.

For example, it is convenient to use a clearance 28 of 0.025 mm. to 0.15 mm. and a clearance 30 of 0.10 mm. to 0.17 mm. for a bearing having an overall diameter dimension for the shell 20 in the order of 51.75 mm. and in the order of 41.15 mm. for the spherical inner member 14.

By providing the ring insert 20 with such radial clearances the over-all friction of the compound bearing of the invention is reduced substantially under a normal transverse load tending to compress the elastomeric rings 36 along a radius of the spherical surface 16 of the inner member 14. When the bearing is subjected to an excessively heavy load, the load in excess of that which may be absorbed by the elastomeric rings 36 is taken by the larger surfaces of the substantially incompressible metallic ring insert 20. As the bearings of the invention are designed for normally absorbing a predetermined static load taken by the elastomeric rings 36, the ring insert 20 is normally not called upon to aid absorbing the normal static load, but is called upon to aid absorbing such excessively heavy loads which are generally of a shock or vibratory nature, and which may exceed the normal dynamic load by several orders of magnitude. The elastomeric rings 36 are designed purposely such as to be capable of sustaining a static load several times the static load normally encountered in service, with the result that the excess loads of a shock or vibratory nature are considerably absorbed and dampened prior to causing the ring insert 20 to "bottom", i.e. to physically engage with the spherical surface 16 of the inner member 14 and with the bore surface 26 of the shell 12, and therefore absorb the remaining excess loads.

Compound bearings according to the present invention, when subjected to intensive tests under transverse static load coupled with vibrations and repeated cycles during which the shell 12 is rotated relative to the axis of the inner member 14 to extreme positions such as illustrated at FIG. 5, generate much less heat than conventional bearings having lubricant-impregnated fabric rings and a nylon ring insert of comparable sizes. While, under the same conditions of load, amplitude of rotation and vibration, the temperature of prior art bearings may reach 150° C. to 180° C. causing the nylon ring insert and the lubricant-impregnated rings to literally self-destruct in a short time at such high temperatures, the temperature of bearings according to the improvement of the present invention never exceeds 90° C., while tested in an ambient of approximately 18°–19° C. If heat from an external source is applied to the bearings during tests, as soon as the temperature of the prior art bearings reaches about 160° C., no more heat from an external source can be applied to the bearings as, at that temperature, they rapidly lose their lubricant through seepage from the fabric rings, the fabric rings char and the nylon ring insert is irreversibly damaged. By contrast, bearings according to the improvement of the present invention are capable of continuous operation without breakdown and without destructive wear at temperatures as high as 170° C.–180° C. for extended periods of time, and they are incapable of reaching such high temperatures on their own unless subjected to heat from an external source.

It has been observed that after bearings according to the present invention have been in service for a short period of time, the polytetrafluorethylene or other fluorocarbon material used for forming the rings 36, as illustrated at FIG. 5, tends to flow and creep into the spaces created by the clearances 28 and 30 respectively, between the concave spherical surface 22 of the ring insert 20 and the convex spherical surface 16 of the bearing inner member 14, and between the cylindrical peripheral surface 24 of the ring insert 20 and the inner bore 26 of the shell 12, thus forming a non-adhering thin film coating between the corresponding surfaces, as shown schematically at 52. Creeping of the material is enhanced by subjecting the rings 36 to relatively high compression preload during assembly of the bearing units. The reason for the formation of such layers 52 interposed between the spherical bearing surfaces 22 and 16 and between the peripheral surface 24 of the ring insert 20 and the inner bore 26 of the housing shell 12 is not well understood, but it has been observed that rather than being detrimental to the operation and long life of the bearings according to the present invention it results in positively improved characteristics under most conditions of load, motion and vibrations.

Although compound bearing units according to the present invention perform satisfactorily in a dry state, without lubrication, it may be desirable for some applications to pre-pack the bearings, during assembly, with a lubricant such as grease and the like. For that purpose, the structure of the compound bearings of the invention is modified as illustrated at FIGS. 6–8, by providing the spherical peripheral surface 16 of the inner bearing member or ball 14 with a circular groove 54, and by providing the annular member or ring insert 20 with transverse grooves 56 and radial apertures 58. The circular groove 54 on the spherical surface 16 of the inner member 14, the ring insert grooves 56, and the apertures 58 in the ring insert serve as lubricant reservoirs and are filled with lubricant, prior to assembly, and the clearance annular spaces 28 and 30 are also similarly filled with lubricant.

Having thus described the invention, modifications whereof will be apparent to those skilled in the art, and it being appreciated that the principles of the invention which have been described in conjunction with a spherical type of bearing are also applicable to other shapes of bearings such as cylindrical bearings and the like, what is claimed as new is as follows:

We claim:

1. A bearing comprising an inner member having a peripheral surface of regular predetermined contour, an outer member having an inner surface of regular predetermined contour, a metallic ring insert disposed between the peripheral surface of the inner member and the inner surface of the outer member, said ring insert having an inner surface generally conforming to the peripheral surface of said inner member and a peripheral surface generally conforming to the inner surface of said outer member, wherein said ring insert inner surface and said inner member peripheral surface are normally separated by a relatively narrow space and said ring insert peripheral surface and said outer member inner surface are normally separated by a relatively narrow space, a pair of resiliently deformable rings made each of material capable of creeping at least partially into said relatively narrow spaces, each of said resiliently deformable rings being disposed on each side of said ring insert, and means in said outer member holding said resiliently deformable rings under compression such as to firmly engage said resiliently deformable rings with a portion of the peripheral surface of said inner member, a portion of the inner surface of said outer member and a lateral surface of said ring insert, and such as to cause said material of said resiliently deformable rings to creep into said relatively narrow spaces for at least partially filling said relatively narrow spaces with said material.

2. The bearing of claim 1 wherein said deformable rings are made of fluorocarbon material.

3. The bearing of claim 2 wherein each of said deformable rings prior to installing under compression in said bearing has an inner surface for engagement with the peripheral surface of said inner member provided with a plurality of concentric grooves and ridges.

4. The bearing of claim 2 wherein said ring insert is made of steel.

5. The bearing of claim 1 wherein said fluorocarbon material is polytetrafluoroethylene.

6. The bearing of claim 5 wherein said ring insert is made of steel.

7. The bearing of claim 5 wherein each of said deformable rings prior to installing under compression in said bearing has an inner surface for engagement with the peripheral surface of said inner member provided with a plurality of concentric grooves and ridges.

8. The bearing of claim 1 wherein said ring insert is made of steel.

9. The bearing of claim 8 wherein each of said deformable rings prior to installing under compression in said bearing has an inner surface for engagement with the peripheral surface of said inner member provided with a plurality of concentric grooves and ridges.

10. The bearing of claim 1 wherein each of said deformable rings prior to installing under compression in said bearing has an inner surface for engagement with the peripheral surface of said inner member provided with a plurality of concentric grooves and ridges.

11. The bearing of claim 1 wherein the peripheral surface of said inner member and the inner surface of said ring insert are conforming spherical surfaces.

12. The bearing of claim 1 wherein the peripheral surface of said ring insert and the inner surface of said outer member are conforming cylindrical surfaces.

13. The bearing of claim 1 wherein said outer member is provided with a pair of lateral integral flanges, one of said flanges being swaged after assembly and holding said deformable rings under compression.

14. The bearing of claim 13 further comprising at least one annular groove in the peripheral surface of said inner member, said annular groove being filled with a lubricant.

15. The bearing of claim 1 further comprising at least one transverse groove in the inner surface of said ring insert and a radial aperture open to said groove and open to the peripheral surface of said ring insert, said groove and said aperture being filled with lubricant.

* * * * *